(12) United States Patent
Fraenzel (10) Patent No.: US 10,017,268 B2
(45) Date of Patent: Jul. 10, 2018

(54) METHOD OF MONITORING AT LEAST ONE FREEWHEEL OF A ROTARY WING AIRCRAFT, AND AN AIRCRAFT

(71) Applicant: AIRBUS HELICOPTERS, Marignane (FR)

(72) Inventor: Julien Fraenzel, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/459,343

(22) Filed: Mar. 15, 2017

(65) Prior Publication Data

US 2017/0267364 A1 Sep. 21, 2017

(30) Foreign Application Priority Data

Mar. 15, 2016 (FR) .................... 16 00428

(51) Int. Cl.
| | |
|---|---|
| *B64D 31/00* | (2006.01) |
| *B64D 45/00* | (2006.01) |
| *F01D 5/02* | (2006.01) |
| *F01D 15/02* | (2006.01) |
| *F01D 21/00* | (2006.01) |
| *F01D 15/08* | (2006.01) |

(52) U.S. Cl.
CPC ............ *B64D 31/00* (2013.01); *B64D 45/00* (2013.01); *F01D 5/02* (2013.01); *F01D 15/02* (2013.01); *F01D 15/08* (2013.01); *F01D 21/003* (2013.01); *F05D 2220/323* (2013.01); *F05D 2260/4023* (2013.01)

(58) Field of Classification Search
CPC ......... B64D 31/00; B64D 45/00; F01D 15/08; F01D 15/02; F01D 5/02; F01D 21/003; F05D 2260/4023; F05D 2220/323
See application file for complete search history.

(56) References Cited

U.S. PATENT DOCUMENTS

| | | | |
|---|---|---|---|
| 3,721,325 A | 3/1973 | Richmond | |
| 8,442,740 B2 | 5/2013 | Rossotto | |
| 9,353,642 B2 | 5/2016 | Certain | |
| 2014/0200790 A1* | 7/2014 | Massot | ................... F02C 6/206 |
| | | | 701/99 |

FOREIGN PATENT DOCUMENTS

| | | |
|---|---|---|
| EP | 2518582 | 10/2012 |
| EP | 2735508 | 5/2014 |
| EP | 2757236 | 7/2014 |

OTHER PUBLICATIONS

French Search Report for French Application No. FR 1600428, Completed by the French Patent Office dated Jan. 12, 2017, 7 Pages.

* cited by examiner

*Primary Examiner* — Yuen H Wong
(74) *Attorney, Agent, or Firm* — Brooks Kushman P.C.

(57) ABSTRACT

A method of monitoring a first freewheel interposed between a first drive shaft of a first engine and a rotor. The state of operation of said first freewheel is correct if the first inlet speed of rotation of the first drive shaft lies in a second range of values corresponding to the current stage of operation while the outlet speed of rotation of the rotor lies in a first range of values corresponding to the current stage of operation.

18 Claims, 3 Drawing Sheets

METHOD OF MONITORING AT LEAST ONE FREEWHEEL OF A ROTARY WING AIRCRAFT, AND AN AIRCRAFT

CROSS-REFERENCE TO RELATED APPLICATIONS

This application claims priority to French patent application No. FR 16 00428 filed on Mar. 15, 2016, the disclosure of which is incorporated in its entirety by reference herein.

BACKGROUND OF THE INVENTION

Field of the Invention

The present invention relates to a method of monitoring at least one freewheel of a rotary wing aircraft. The invention also relates to a rotary wing aircraft applying the method.

The invention thus lies in the field of devices for monitoring power plants of rotary wing aircraft.

Description of Related Art

Conventionally, a rotary wing aircraft has a power plant with a rotor providing the aircraft with at least part of its lift. The rotor may also participate at least in part in propelling the aircraft. Thus, a helicopter has a main rotor that provides it both with lift and with propulsion.

The rotor is driven in rotation by a power transmission gearbox that is itself driven by at least one engine.

For example, the power plant may include a turboshaft engine having a gas generator and a free power turbine. The free turbine is then connected by a mechanical power transmission train to the power transmission gearbox.

The mechanical power transmission train is usually provided with an overrunning clutch or "freewheel". The freewheel has a driving portion connected to an engine and a driven portion connected to the power transmission gearbox.

The function of such a freewheel is to enable the rotor to be driven by the engine while, on the contrary, preventing the engine being driven by the mechanical drive train. By way of example, the freewheel may be of particular advantage during a stage in which the rotary wing is in autorotation.

Such a freewheel may be subject to damage in the course of its use. Under such circumstances, the damaged freewheel may slip, constituting the seat of mechanical slip between two parts.

For example, the freewheel may have rollers interposed between the driving portion and the driven portion. The rollers then enable the driven portion to be driven by the driving portion. Nevertheless, the rollers can erode and no longer perform their function correctly.

On starting the engine, a worn freewheel can give rise to mechanical interruption in the mechanical drive train. If the driving portion of the freewheel no longer drives the driven portion, then a free turbine turboshaft engine runs the risk of its free turbine overspeeding. If mechanical transmission between the driving portion and the driven portion is intermittent, then the engine can be subjected to mechanical jolting in the event of the driving and driven portions suddenly engaging each other.

Slip of the freewheel can also give rise to abnormal wear of the mechanical components present between the engine and the rotor of the rotary wing, e.g. as a result of repeated jolting.

Consequently, periodic maintenance actions may be undertaken to verify the operation of each freewheel. These maintenance actions need to be carried out after flying for only a short length of time, so they are generally performed by the crew of the aircraft.

U.S. Pat. No. 3,721,325 describes a mechanism having a freewheel, but does not propose any solution for verifying its operation.

Documents EP 2 757 236, EP 2 735 508, and EP 2 518 582 are also known.

Document EP 2 757 236 describes a method of starting a turboshaft engine of an aircraft, which aircraft has a rotary wing and a freewheel interposed in a mechanical power transmission train between the engine and a rotor of the rotary wing, the engine having a gas generator and a free turbine, and the mechanical power transmission train including an upstream portion connecting the free turbine to the freewheel. In that method, the torque exerted on the upstream portion is measured with a first measurement device, and a speed of rotation of said gas generator is measured with a second measurement device. Said torque is compared with a torque threshold and said speed of rotation is compared with a speed threshold, by means of a processor unit. Starting of the engine is stopped when said torque is below the torque threshold and when said speed of rotation of the gas generator is higher than a speed threshold.

BRIEF SUMMARY OF THE INVENTION

An object of the present invention is thus to propose an aircraft system for automatically monitoring a freewheel, the freewheel being interposed between an engine and a rotor contributing to providing the aircraft with lift or indeed with propulsion.

The invention thus provides a monitoring method for monitoring at least one freewheel interposed between a drive shaft of an engine of an aircraft and a rotor of a rotary wing of the aircraft, a freewheel referred to as a "first" freewheel being interposed between the first drive shaft of an engine referred to as the "first" engine and the rotor.

The method comprises the following steps:

determining that a stage of operation of the first engine has been initiated, the stage of operation comprising at least a stage of starting the first engine and/or at least a stage of stopping the first engine;

measuring a speed of rotation of said first drive shaft referred to as the "first inlet speed of rotation";

measuring a speed of rotation of said rotor referred to as the "outlet speed of rotation";

comparing the outlet speed of rotation with a first predetermined range of values, the first range of values being bounded by a first low bound and by a first high bound that vary as a function of the stage of operation of the first engine;

comparing the first inlet speed of rotation with a second predetermined range of values, the second range of values being bounded by a second low bound and by a second high bound, which vary as a function of the stage of operation of the first engine; and determining a state of operation of the first freewheel, this state of operation being a correct state of operation if the first inlet speed of rotation lies in the second range of values corresponding to a current stage of operation while the outlet speed of rotation lies in the first range of values corresponding to the current stage of operation, the state of operation being an incorrect state of operation if the first inlet speed of rotation does not lie in the second range of values while the outlet speed of rotation lies in the first range of values.

The method determines the operation of the freewheels at a calculation frequency. The term "current" refers to the current calculation instant. Under such circumstances, the current stage of operation corresponds to the stage of operation at the time of the calculation instant under consideration.

In the method, a processor unit determines at each calculation instant whether a first condition is satisfied. This first condition is satisfied if the current outlet speed of rotation lies in the first operating range allocated to the current stage of operation.

If the condition is satisfied, or else in parallel, the processor unit also determines whether a second condition is satisfied. This second condition is satisfied if the first inlet speed of rotation lies in the second predetermined range of values allocated to the current stage of operation.

Specifically, the Applicant has found that two different stages of operation can give rise to two different first operating ranges and two different second operating ranges. The Applicant thus adapts the operating ranges that are to be verified as a function of the stage of operation of the engine.

When both conditions are satisfied, the first freewheel should be considered as being in a correct state of operation.

When the first condition is satisfied but the second condition is not satisfied, the first freewheel should, on the contrary, be considered as not operating correctly.

When the first condition is not satisfied, the processor unit does not decide about the state of operation of the freewheel, regardless of whether or not the second condition is satisfied.

Under such circumstances, the method makes it easy to test the operation of the first freewheel in order to interrupt starting of an engine, should that be necessary, or to trigger a maintenance operation, for example. The tests are performed automatically, and therefore do not imply periodic actions of manually inspecting the first freewheel.

The monitoring method may also include one or more of the following characteristics.

Thus, the method may include a display step, the state of operation being displayed on a display during the display step.

An alarm can thus be sent to a pilot in order to indicate a freewheel fault.

The method may include a storage step, the state of operation being stored in a memory.

This state of operation may be stored and then inspected on the ground.

Such inspection can enable a maintenance operator to determine whether the freewheel needs to be replaced.

Furthermore, outside starting and stopping stages, the synchronization state of a freewheel can be determined as a function of the inlet speed of rotation of the engine connected to the freewheel, of the torque developed by the engine, of the outlet speed of rotation of the rotor, or indeed of the speed of rotation of a gas generator of the engine, if the engine is a turboshaft engine. This synchronization state consists in determining whether the driving portion and the driven portion are rotating together.

The operator can then sum the total time during which the freewheel is synchronized in order to optimize the lifetimes of the mechanical members of the power transmission train.

The method may include a step of automatically stopping the first engine driving the first freewheel if the first freewheel is in an incorrect state of operation and if the first engine is in a starting stage.

In this configuration, the first engine may be switched off automatically, e.g. to avoid the first engine reaching an overspeed situation.

In another aspect, the aircraft includes at least one selector having at least a "stop" position for causing an engine to stop, and a "flight" position for causing the engine to operate normally, and the stage of operation of an engine at each instant may be:

a starting stage when the selector is operated to go from the "stop" position to the "flight" position; or a stopping stage when the selector is operated to pass from the "flight" position to the "stop" position.

Optionally, the selector includes at least one "idle" position for causing the first engine to idle, and said stage of operation at each instant may be:

a starting stage when the selector is operated to pass from the "stop" position to the "idle" position; or a starting stage when the selector is operated to pass from the "idle" position to the "flight" position; or a stopping stage when the selector is operated to pass from the "flight" position to the "idle" position; or a stopping stage when the selector is operated to pass from the "idle" position to the "stop" position.

Thereafter, the operating stages may comprise a plurality of starting stages and a plurality of stopping stages. Under such circumstances, the operation of the freewheel can be monitored at multiple times during a single flight.

Two distinct starting stages may give rise to distinct ranges of values. In particular, passing the selector from the "stop" position to the "flight" position or from the "stop" position to the "idle" position can give rise to a first range of values and to a second range of values that are different from those on passing from the "idle" position to the "flight" position.

Likewise, two distinct stopping stages can give rise to different ranges of values. In particular, passing the selector from the "flight" position to the "stop" position or from the "flight" position to the "idle" position can give rise to a first range of values and a second range of values that are different from those on passing from the "idle" pressure to the "stop" pressure.

In another aspect, during a stopping stage and at each calculation instant, the second low bound and the second high bound may be a function of the current outlet speed of rotation at the calculation instant.

The Applicant has observed that during a preliminary stage, the outlet speed of rotation is less than the quotient of the first inlet speed of rotation divided by a proportionality constant.

Nevertheless, as from a given instant, the outlet speed of rotation is equal to the quotient of the first inlet speed of rotation divided by the proportionality constant, to within a margin of measurement error.

Under such circumstances, the first low bound may be determined to represent the outlet speed of rotation that should be reached in theory at said given instant. The first high bound may be determined to represent the outlet speed of rotation that should be reached in theory when the processor unit has performed a predetermined number of tests.

Likewise, the second low bound may be determined to represent the value of the product of the outlet speed of rotation multiplied by the proportionality constant that should be reached in theory at said given instant, minus an accuracy margin concerning the measurement of the first inlet speed of rotation. The first high bound may be determined to represent the value of said product that should be reached in theory when the processor unit has performed a predetermined number of tests, plus a measurement accuracy margin.

During a stopping stage, the second low bound and the second high bound may be equal to two respective predetermined constants.

The Applicant has observed that during a stopping stage, the first inlet speed of rotation is less than the product of the outlet speed of rotation and of the proportionality constant. Nevertheless, the first inlet speed of rotation lies within a range that can be determined by testing.

This method applies to a single-engine aircraft.

Nevertheless, the method can also be applied to an aircraft having a plurality of engines.

Thus, when the aircraft includes at least one engine referred to as a "second" engine for starting after the first engine, a second freewheel being interposed between a second drive shaft of the second engine and said rotor, the method may comprise the following steps:

determining that a stage of operation of the second engine has been initiated, said stage of operation comprising at least a starting stage of the second engine and/or at least a stopping stage of the second engine;

measuring a speed of rotation of said second drive shaft referred to as the "second inlet speed of rotation";

comparing the second inlet speed of rotation with a third predetermined range of values, the third range of values being bounded at least by a third high bound; and determining a state of operation of said second freewheel at least as a function of said comparison of the second inlet speed of rotation with a third predetermined range of values.

During a starting stage, the second inlet speed of rotation lies in the third predetermined range of values if the second inlet speed of rotation is less than the product of the outlet speed of rotation multiplied by a predetermined proportionality constant, the state of operation of the second freewheel being a correct state of operation if the second inlet speed of rotation lies in said third range of values corresponding to the current stage of operation.

By way of example, this test may be performed from the beginning of a starting stage and for a predetermined duration, or indeed until the engine has reached the target set by the pilot using the selector.

During a stopping stage with the third range of values being bounded by a third low bound and the third high bound, the third low bound and the third high bound are equal to two respective predetermined constants, the state of operation of the second freewheel being a correct speed of rotation if the second inlet speed of rotation lies in the third range of values corresponding to the current stage of operation, while the outlet speed of rotation lies in a first range of values corresponding to the current stage of operation.

The first low bound and the first high bound of the first range of values applied during the first freewheel test may be different from the first low bound and the first high bound of the first range of values applied when testing a second freewheel.

The invention also provides an aircraft having a rotary wing and at least one engine referred to as a "first" engine, a first freewheel being interposed between a first drive shaft of the first engine and a rotor of the rotary wing, the aircraft including a monitoring system for monitoring at least the first freewheel.

The monitoring system comprises:

a first measurement device measuring a speed of rotation of the first drive shaft referred to as the "first inlet speed of rotation";

a second measurement device measuring a speed of rotation of the rotor referred to as the "outlet speed of rotation"; and a processor unit connected to the first measurement device and to the second measurement device, the processor unit applying the method according to the invention to determine a state of operation of said first freewheel.

Furthermore, the monitoring system may include a measurement system measuring at least one parameter for determining a stage of operation of an engine.

By way of example, such a measurement system determines the position of the selector controlling an engine. When the selector is a rotary lever, the measurement system may comprise an angle sensor that generates a signal representing the position of the selector.

In addition, the processor unit may be connected to at least one of the following members: a warning unit provided with a display suitable for displaying said state of operation, a memory suitable for storing said state of operation, and a control and regulation unit suitable for stopping the first engine.

The aircraft may also have at least one second engine for starting after the first engine, a freewheel referred to as the "second" freewheel being interposed between each second outlet shaft of a second engine and the rotor. The monitoring system includes a third measurement device measuring a speed of rotation of said second drive shaft referred to as the "second inlet speed of rotation".

BRIEF DESCRIPTION OF THE DRAWINGS

The invention and its advantages appear in greater detail from the context of the following description of examples given by way of illustration and with reference to the accompanying figures, in which.

Elements that are present in more than one of the figures are given the same references in each of them.

DETAILED DESCRIPTION OF THE INVENTION

Figure 1:
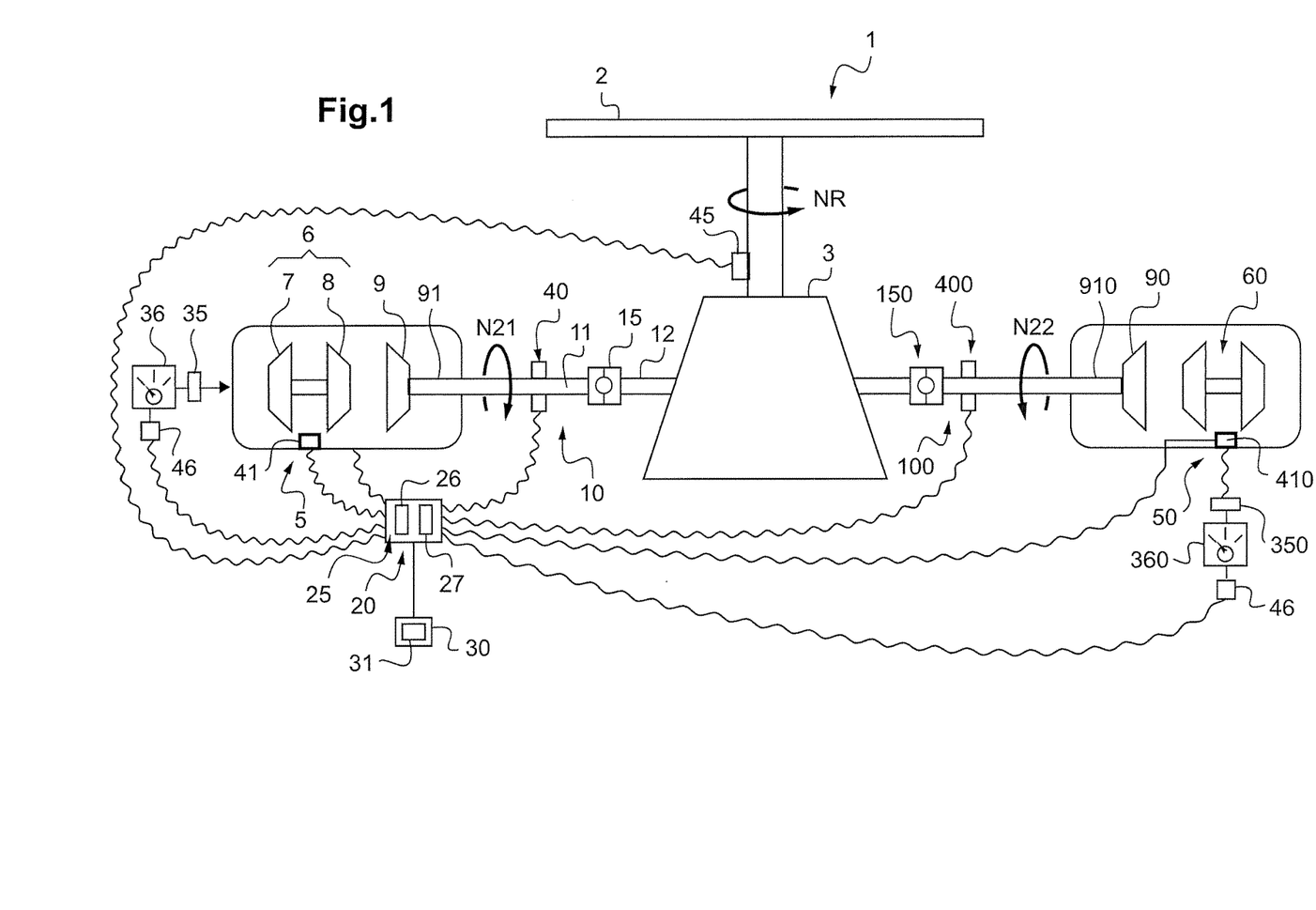
FIG. 1 is a diagram showing an aircraft of the invention.

FIG. 1 shows an aircraft 1 of the invention.

The aircraft 1 has a rotary wing with at least one rotor 2.

In order to rotate the rotary wing, the aircraft 1 has at least one engine referred to as the "first" engine 5, and a power transmission gearbox 3. At least a first engine 5, and possibly also a second engine 50, then drive(s) the power transmission gearbox 3 via a mechanical power transmission train 10, 100, the power transmission gearbox 3 then rotating the rotor 2.

Each engine has a rotary drive shaft driving a mechanical power transmission train. Each mechanical power transmission train includes an overrunning clutch or "freewheel" 15, 150.

By way of example, such an engine may be a fuel-burning engine.

In FIG. 1, a first engine 5 may be a first turboshaft engine. This first turboshaft engine has a first gas generator 6. This first gas generator is then conventionally provided with a first compressor 7 connected to a first high pressure turbine 8.

Furthermore, the first turboshaft engine is provided with a first power turbine 9. The gas coming from the first gas generator 6 then rotates the first power turbine 9, with the first power turbine 9 serving to rotate a first drive shaft 91. The first power turbine may be a free turbine that is not constrained to rotate with the first gas generator, or it may be a turbine known as a "linked" turbine that is constrained in rotation with the first gas generator.

Thereafter, a first mechanical power transmission train 10 connects the first drive shaft to the power transmission gearbox 3. This mechanical power transmission train 10 possesses in particular a first freewheel 15.

Thus, the first freewheel 15 has a driving portion connected mechanically to the first drive shaft either directly or indirectly via an upstream portion 11 of the transmission train. Furthermore, the first freewheel 15 has a driven portion mechanically connected to the power transmission gearbox 3, directly or via a downstream portion 12 of the transmission train. The downstream portion and/or the upstream portion may be provided with at least one power transmission shaft, connection means for accommodating misalignments, . . . .

Optionally, the aircraft 1 has a second engine 50. Like the first engine 5, the second engine 50 may comprise a second gas generator 60 and a second power turbine 90. The second power turbine 90 is secured to a second drive shaft 910. Thereafter, a second mechanical power transmission train 100 connects the second drive shaft 91 to the power transmission gearbox 3. This mechanical power transmission train 100 possesses in particular a second freewheel 150.

Optionally, and in an embodiment that is not shown, each engine drives a combining gearwheel, the combining gearwheel being mechanically connected to the power transmission gearbox 3.

Whatever the way in which it is regulated, the first outlet speed of rotation N21, N22 of each engine is proportional to the outlet speed of rotation NR. The first outlet speed of rotation N21, N22 of each engine is thus equal to the product of the outlet speed of rotation NR multiplied by a proportionality constant k greater than unity.

The first engine 5 and the second engine 50 may each be regulated by a respective regulation and control unit 35, 350. Such a unit may be a unit known as a full authority digital engine control (FADEC).

Each regulation and control unit 35, 350 may be controlled in particular by a control selector 36, 360 referred to more simply as a "selector". Each selector may have a "stop" position requesting the corresponding engine to stop, and a "flight" position requesting normal operation of the engine, i.e. operation at a speed other than idling speed, and possibly also a "idle" position requesting the corresponding engine to be caused to idle.

The aircraft 1 is then provided with a monitor system 20 for monitoring the operation of each freewheel.

The monitor system 20 comprises a processor unit 25. By way of example, the processor unit 25 may comprise a processor, an integrated circuit, a programmable system, or a logic circuit, these examples not limiting the scope to be given to the term "processor unit".

The processor unit may be an independent unit, or it may be a unit integrated in existing equipment, e.g. in a regulation and control unit 35, 350.

In the embodiment of FIG. 1, the processor unit comprises a processor or the equivalent 26 and a memory 27, the processor executing instructions stored in the memory 27 to perform the method of the invention.

The monitor system 20 comprises a first measurement device 40 connected to the processor unit. The first measurement device 40 measures a speed of rotation of the first drive shaft 91 referred to as the "first inlet speed of rotation N21". This first measurement device 40 may comprise a phonic wheel, for example.

Optionally, the speed of rotation of the first gas generator is measured by a conventional system 41.

The monitor system 20 includes a second measurement device 45 connected to the processor unit. The second measurement device 45 measures a speed of rotation of the rotor 2 referred to as the "outlet speed of rotation NR". The second measurement device 45 may comprise a phonic wheel, for example.

For each second engine 50, the monitor system 20 includes a third measurement device 400 connected to the processor unit. Each third measurement device 400 measures a speed of rotation of the second drive shaft 910 referred to as the "second inlet speed of rotation N22" of a second engine.

In addition, the monitor system 20 may include a measurement system 46, 460 measuring at least one parameter for determining a stage of operation of an engine 5, 50. Such a measurement system 46, 460 may comprise a sensor for determining the position of a selector 36, 360 of an engine.

The processor unit 25 may also be connected to at least one of the following members: a warning unit 30 provided with a display 31 suitable for displaying an operating state of a freewheel, a memory suitable for storing the operating state, a control and regulation unit 35, 350. The memory storing the operating state may comprise a memory of the processor unit, or indeed it may be a removable memory, for example.

Figure 2:
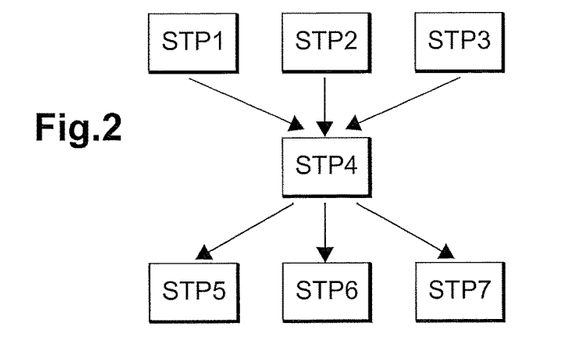
FIG. 2 is a diagram explaining the method of the invention.

FIG. 2 shows the method of the invention.

In a first step STP1, the processor unit determines whether a stage of operation of the first engine 5 and/or of the second engine 50 has been initiated. Such a stage of operation comprises at least a stage of starting the first engine, or a stage of stopping the first engine 5.

The stage of operation of an engine 5, 50 may at each instant be a starting stage selected from the following list:

a first starting stage when the selector 36, 360 of the engine is moved from the "stop" position to the "flight" position;

a second starting stage when the selector 36, 360 of the engine is moved from the "stop" position to the "idle" position; and a third starting stage when the selector 36, 360 of the engine is moved from the "idle" position to the "flight" position.

The stage of operation of an engine 5, 50 may at each instant be a stopping stage selected from the following list:

a first stopping stage when the selector 36, 360 of an engine is moved from the "flight" position to the "stop" position;

a second stopping stage when the selector 36, 360 of an engine is moved from the "flight" position to the "idle" position; and a third stopping stage when the selector 36, 360 of an engine is moved from the "idle" position to the "stop" position.

The processor unit may consider that each stage of operation terminates at the end of a predetermined duration, or at the end of a number of cycles of checking a freewheel, or indeed when the engine has reached the target set by the position of the associated selector. For example, the stopping stage requested by moving the selector into a "stop" position comes to an end when the engine in question has stopped completely.

During a second step STP2, the processor unit determines the first inlet speed of rotation N21 by using the first measurement device 40. In an aircraft having a plurality of engines, the second inlet speed of rotation N22 of each second engine is determined by using the third measurement device 400.

During a third step STP3, the processor unit 25 determines the outlet speed of rotation NR by using the second measurement device 45.

During a processing step STP4, the processor unit determines the state of operation of each freewheel.

During a display step STP5, the processor unit transmits a signal relating to this operating state to the warning unit 30. The warning unit then displays the operating state on the display 31.

An audible or visible alarm may be triggered on starting the first engine if the first freewheel is judged to be defective.

During a storage step STP6, the processor unit transmits a signal relating to this state of operation to a memory 27 in order to store it.

During a step STP7 of automatically stopping the first engine, the processor unit communicates with the regulation and control member 35 of the first engine to request stopping of the first engine if the first freewheel 15 is in an incorrect state of operation and if the first engine 5 is in a starting stage.

Figure 3:
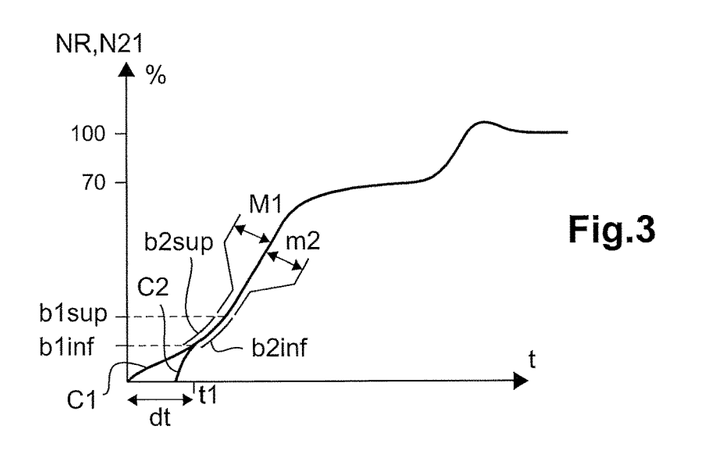
FIGS. 3 and 4 are two graphs showing the application of the invention to an aircraft having only a first engine.
Figure 4:
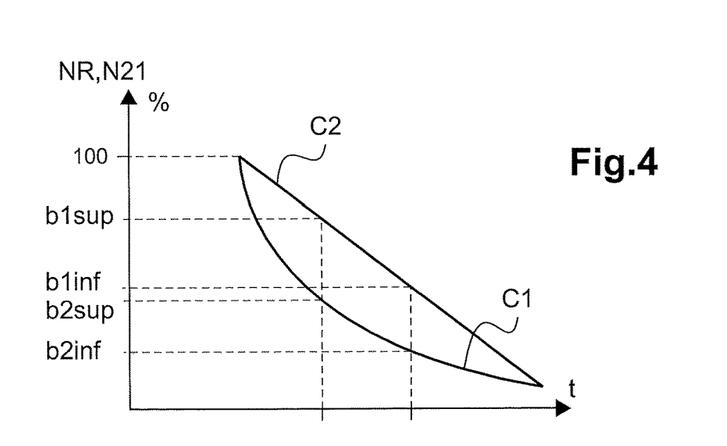

FIGS. 3 and 4 show the method of the invention as applied to an aircraft having only a first engine.

In particular, FIG. 3 shows the application of the method of the invention during a starting stage.

Each of FIGS. 3 and 4 comprises a graph having time plotted along the abscissa axis. The outlet speed of rotation NR and the first inlet speed of rotation N21 divided by the proportionality constant k are plotted up the ordinate axis as a percentage of a nominal speed of rotation. A first curve C1 plots the variation over time of the first inlet speed of rotation N21 divided by the proportionality constant k, and a second curve C2 plots the variation of the outlet speed of rotation NR.

With reference to FIG. 3, and independently of the stage of operation and of the number of engines, at each calculation instant the processor unit compares the outlet speed of rotation NR with a first predetermined range of values.

The first range of values is bounded by a first low bound b1$inf$ and a first high bound b1$sup$ that vary as a function of the stage of operation of the first engine 5.

Furthermore, at each calculation instant the processor unit compares the first inlet speed of rotation N21 with a second predetermined range of values. The second range of values is bounded by a second low bound b2$inf$ and by a second high bound b2$sup$ that vary as a function of the stage of operation of the first engine 5.

Thereafter, the processor unit deduces therefrom, where applicable, the operating state of the first freewheel. This operating stage of the first freewheel 15 is a correct operating state if the first inlet speed of rotation N21 lies in the second range of values corresponding to the current stage of operation while the outlet speed of rotation NR lies in the first range of values corresponding to the current stage of operation. Consequently, if the following two inequalities are satisfied, then the state of operation of the first freewheel is correct:

b1$inf$<NR<b1$sup$
b2$inf$<N21<b2$sup$

In contrast, the state of operation of the first freewheel 15 is an incorrect state of operation if the first inlet speed of rotation N21 does not lie in the second range of values while the outlet speed of rotation NR is in the first range of values. For example, if the following two inequalities are satisfied during a starting stage, then the state of operation of the first freewheel is incorrect:

b1$inf$<NR<b1$sup$
N21>b2$sup$

FIG. 3 shows the starting stage. After the selector has been moved from the "stop" position to the "flight" position, which is reached at about 100% of the nominal speed of rotation, or else to the "idle" position, which is reached at about 70% of the nominal outlet speed of rotation in the example shown, the first inlet speed of rotation N21 represented by the first curve C1 increases starting from an initial instant t0.

In contrast, the outlet speed of rotation represented by the second curve C2 increases with a time offset dt.

As from a given instant T1, the first curve C1 and the second curve C2 coincide. The first low bound b1$inf$ may correspond substantially to the outlet speed of rotation reached when the first curve C1 joins the second curve C2.

The first high bound b1$sup$ is positioned relative to the first low bound b1$inf$ as a function of the calculation frequency and of the desired number of calculation cycles.

Furthermore, during a starting stage and at each calculation instant, the second low bound b2$inf$ and the second high bound b2$sup$ are a function of the current outlet speed of rotation NR at the calculation instant.

FIG. 3 shows that the outlet speed of rotation NR and the first inlet speed of rotation N21 divided by the proportionality constant k are theoretically equal. Because of the margins of accuracy for measurement, the method of the invention makes use of measurement margins of accuracy M1 and M2.

Thus, at each calculation instant, the second high bound b2$sup$ may be equal to the sum of the current outlet speed of rotation NR at this calculation instant multiplied by the proportionality constant k plus an accuracy margin M1. Likewise, at each calculation instant, the second low bound b2$inf$ may be equal to the difference of the current outlet speed of rotation NR at this calculation instant multiplied by the proportionality constant k minus an accuracy margin M2.

FIG. 4 shows a stage of stopping the first engine.

When the first engine 5 is stopped by moving the selector 36 from its "flight" position in the example of FIG. 4, the first inlet speed of rotation N21 illustrated by the first curve C1 decreases initially more quickly than the outlet speed of rotation as represented by the second curve C2. Subsequently, the first curve C1 and the second curve C2 coincide.

In one method, the first high bound b1$sup$ and the first low bound b1$inf$ are equal to respective constants. These constants are selected in particular so as to optimize the number of monitor calculation cycles performed.

The second low bound b2$inf$ and the second high bound b2$sup$ are also equal to two respective constants. These constants are predetermined by using the graph of FIG. 4.

Figure 5:
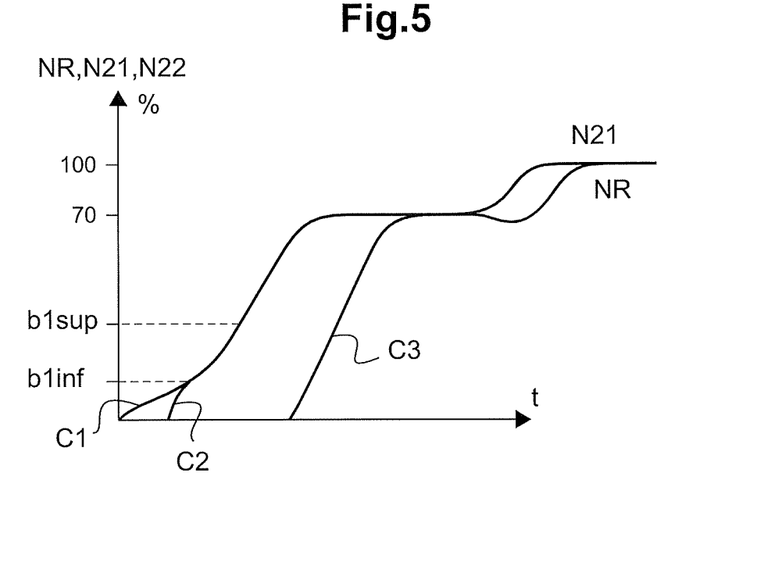
FIGS. 5 and 6 are two graphs showing the application of the invention to an aircraft having a first engine and at least one second engine.
Figure 6:
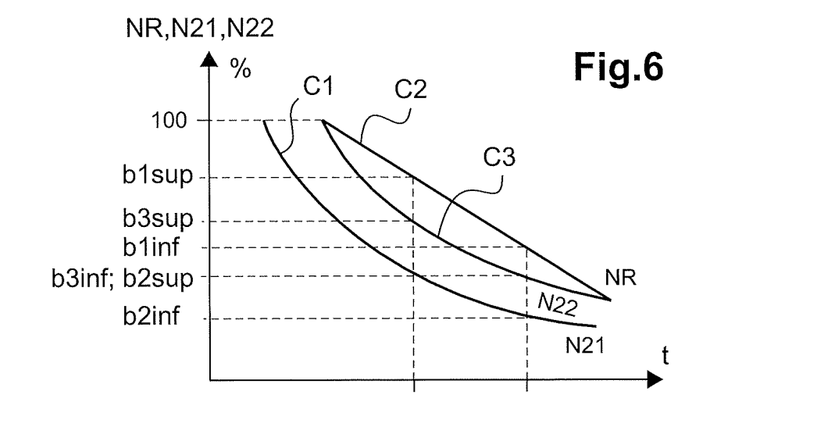

FIGS. 5 and 6 show the operation of the invention on an aircraft a having a first engine and at least one second engine. In the graphs of FIGS. 5 and 6, a third curve C3 represents the second inlet speed of rotation N22 of a second engine divided by the proportionality constant k.

Under such circumstances, the processor unit determines that a stage of operation of the second engine 50 has been initiated, which stage of operation comprises at least a stage of starting the second engine 50 and/or at least a stage of stopping the second engine 50.

Furthermore, the processor unit determines the second inlet speed of rotation N22.

This processor unit then compares the second inlet speed of rotation N22 with a third predetermined range of values, the third range of values being bounded at least by a third high bound b3*sup*.

Under such circumstances, the processor unit determines an operating state of the second freewheel 150 at least as a function of comparing the second inlet speed of rotation N22 with a predetermined third range of values.

With reference to FIG. 5, and during a starting stage, the processor unit thus begins by scanning the operation of the first freewheel using the above-described method.

When the second engine is started, the third curve C3 must lie under the second curve C2, at least for a predetermined duration, or indeed so long as idling speed has not been reached.

Under such circumstances, the processor unit considers that the state of operation of the second freewheel 150 is a correct state of operation providing the second inlet speed of rotation N22 is less than the product of the outlet speed of rotation NR multiplied by the predetermined proportionality constant k.

With reference to FIG. 6, and during a stopping stage, the third range of values is bounded by a third low bound b3*inf* and a third high bound b3*sup*.

The third low bound b3*inf* and the third high bound b3*sup* are equal respectively to two predetermined constants.

The state of operation of the second freewheel 150 is then a correct state of operation providing the second inlet speed of rotation N22 lies in the third range of values corresponding to the current stage of operation, while the outlet speed of rotation NR lies in a first range of values corresponding to the current stage of operation.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

In particular, some of the above-described steps may be performed in an order that is different from the order described.

What is claimed is:

1. A monitoring method for monitoring at least one freewheel interposed between a drive shaft of an engine of an aircraft and a rotor of a rotary wing of the aircraft, the method comprising:
   determining, by a processor unit, that a stage of operation of a first engine has been initiated, the stage of operation comprising at least a stage of starting the first engine and/or at least a stage of stopping the first engine;
   measuring, by the processor unit, a first inlet speed of rotation of a first drive shaft;
   measuring, by the processor unit, an outlet speed of rotation of the rotor;
   comparing, by the processor unit, the outlet speed of rotation with a first predetermined range of values, the first predetermined range of values being bounded by a first low bound and by a first high bound that vary as a function of the stage of operation of the first engine;
   comparing, by the processor unit, the first inlet speed of rotation with a second predetermined range of values, the second predetermined range of values being bounded by a second low bound and by a second high bound, which vary as a function of the stage of operation of the first engine;
   determining, by the processor unit, a state of operation of a first freewheel, the state of operation of the first freewheel being a correct state of operation when the first inlet speed of rotation lies in the second predetermined range of values corresponding to a current stage of operation while the outlet speed of rotation lies in the first predetermined range of values corresponding to the current stage of operation, the state of operation of the first freewheel being an incorrect state of operation when the first inlet speed of rotation does not lie in the second predetermined range of values while the outlet speed of rotation lies in the first predetermined range of values; and
   automatically stopping, by the processor unit, the first engine driving the first freewheel when the first freewheel is in an incorrect state of operation and the first engine is in a starting stage.

2. The monitoring method according to claim 1, wherein the method includes a display step, the state of operation being displayed on a display during the display step.

3. The monitoring method according to claim 1, wherein the method includes a storage step, the state of operation being stored in a memory.

4. The monitoring method according to claim 1, wherein the aircraft includes at least one selector having at least a stop position for causing an engine to stop, and a flight position for causing the engine to operate normally, the stage of operation of an engine at each instant being:
   a starting stage when the selector is operated to go from the stop position to the flight position; or
   a stopping stage when the selector is operated to pass from the flight position to the stop position.

5. The monitoring method according to claim 4, wherein the selector includes at least one idle position for causing the first engine to idle, the stage of operation at each instant being:
   a starting stage when the selector is operated to pass from the stop position to the idle position; or
   a starting stage when the selector is operated to pass from the idle position to the flight position; or
   a stopping stage when the selector is operated to pass from the flight position to the idle position; or
   a stopping stage when the selector is operated to pass from the idle position to the stop position.

6. The monitoring method according to claim 1, wherein, during a stopping stage and at each calculation instant, the second low bound and the second high bound are a function of a current outlet speed of rotation at a calculation instant.

7. The monitoring method according to claim 1, wherein during a stopping stage, the second low bound and the second high bound are equal to two respective predetermined constants.

8. The monitoring method according to claim 1, wherein the aircraft includes a second engine for starting after the first engine, a second freewheel being interposed between a second drive shaft of the second engine and the rotor, the method comprising:
   determining that a stage of operation of the second engine has been initiated, the stage of operation comprising at least a starting stage of the second engine and/or at least a stopping stage of the second engine;

measuring a second inlet speed of rotation of the second drive shaft;

comparing the second inlet speed of rotation with a third predetermined range of values, the third range of values being bounded at least by a third high bound; and determining a state of operation of the second freewheel at least as a function of a comparison of the second inlet speed of rotation with the third predetermined range of values.

9. The monitoring method according to claim 8, wherein during the starting stage, the second inlet speed of rotation lies in the third predetermined range of values when the second inlet speed of rotation is less than a product of the outlet speed of rotation divided by a predetermined proportionality constant, the state of operation of the second freewheel being a correct state of operation when the second inlet speed of rotation lies in the third predetermined range of values corresponding to the current stage of operation.

10. The monitoring method according to claim 8, wherein during the stopping stage with the third predetermined range of values being bounded by a third low bound and the third high bound, the third low bound and the third high bound are equal to two respective predetermined constants, the state of operation of the second freewheel being a correct speed of rotation when the second inlet speed of rotation lies in the third predetermined range of values corresponding to the current stage of operation, while the outlet speed of rotation lies in the first predetermined range of values corresponding to the current stage of operation.

11. An aircraft having a rotary wing and at least a first engine, a first freewheel being interposed between a first drive shaft of the first engine and a rotor of the rotary wing, the aircraft including:

a monitoring system for monitoring at least the first freewheel, wherein the monitoring system comprises:

a first measurement device measuring a first inlet speed of rotation of the first drive shaft;

a second measurement device measuring an outlet speed of rotation of the rotor; and a processor unit connected to the first measurement device and to the second measurement device, the processor unit operable to determine a state of operation of the first freewheel by:

determining that a stage of operation of the first engine has been initiated, the stage of operation comprising at least a stage of starting the first engine and/or at least a stage of stopping the first engine;

measuring a first inlet speed of rotation of the first drive shaft;

measuring an outlet speed of rotation of the rotor;

comparing the outlet speed of rotation with a first predetermined range of values, the first predetermined range of values being bounded by a first low bound and by a first high bound that vary as a function of the stage of operation of the first engine;

comparing the first inlet speed of rotation with a second predetermined range of values, the second predetermined range of values being bounded by a second low bound and by a second high bound, which vary as a function of the stage of operation of the first engine;

determining a state of operation of the first freewheel, the state of operation of the first freewheel being a correct state of operation when the first inlet speed of rotation lies in the second predetermined range of values corresponding to a current stage of operation while the outlet speed of rotation lies in the first predetermined range of values corresponding to the current stage of operation, the state of operation of the first freewheel being an incorrect state of operation when the first inlet speed of rotation does not lie in the second predetermined range of values while the outlet speed of rotation lies in the first predetermined range of values; and automatically stopping the first engine driving the first freewheel when the first freewheel is in an incorrect state of operation and the first engine is in a starting stage.

12. The aircraft according to claim 11, wherein the monitoring system includes a measurement device measuring at least one parameter for determining a stage of operation of an engine.

13. The aircraft according to claim 11, wherein the processor unit is connected to at least one of following members: a warning unit provided with a display for displaying the state of operation, a memory for storing the state of operation, and a control and regulation unit for stopping the first engine.

14. The aircraft according to claim 11, wherein the aircraft has at least one second engine for starting after the first engine, a second freewheel being interposed between each second drive shaft of the second engine and the rotor, and the monitoring system includes a third measurement device measuring a second inlet speed of rotation of the second drive shaft.

15. The aircraft according to claim 11, wherein the aircraft includes at least one selector having at least a stop position for causing an engine to stop, and a flight position for causing the engine to operate normally, the stage of operation of an engine at each instant being:

a starting stage when the selector is operated to go from the stop position to the flight position; or a stopping stage when the selector is operated to pass from the flight position to the stop position.

16. The aircraft according to claim 15, wherein the selector includes at least one idle position for causing the first engine to idle, the stage of operation at each instant being:

a starting stage when the selector is operated to pass from the stop position to the idle position; or a starting stage when the selector is operated to pass from the idle position to the flight position; or a stopping stage when the selector is operated to pass from the flight position to the idle position; or a stopping stage when the selector is operated to pass from the idle position to the stop position.

17. The aircraft according to claim 11, wherein, during a stopping stage and at each calculation instant, the second low bound and the second high bound are a function of a current outlet speed of rotation at a calculation instant.

18. The aircraft according to claim 11, wherein during a stopping stage, the second low bound and the second high bound are equal to two respective predetermined constants.

* * * * *